UNITED STATES PATENT OFFICE.

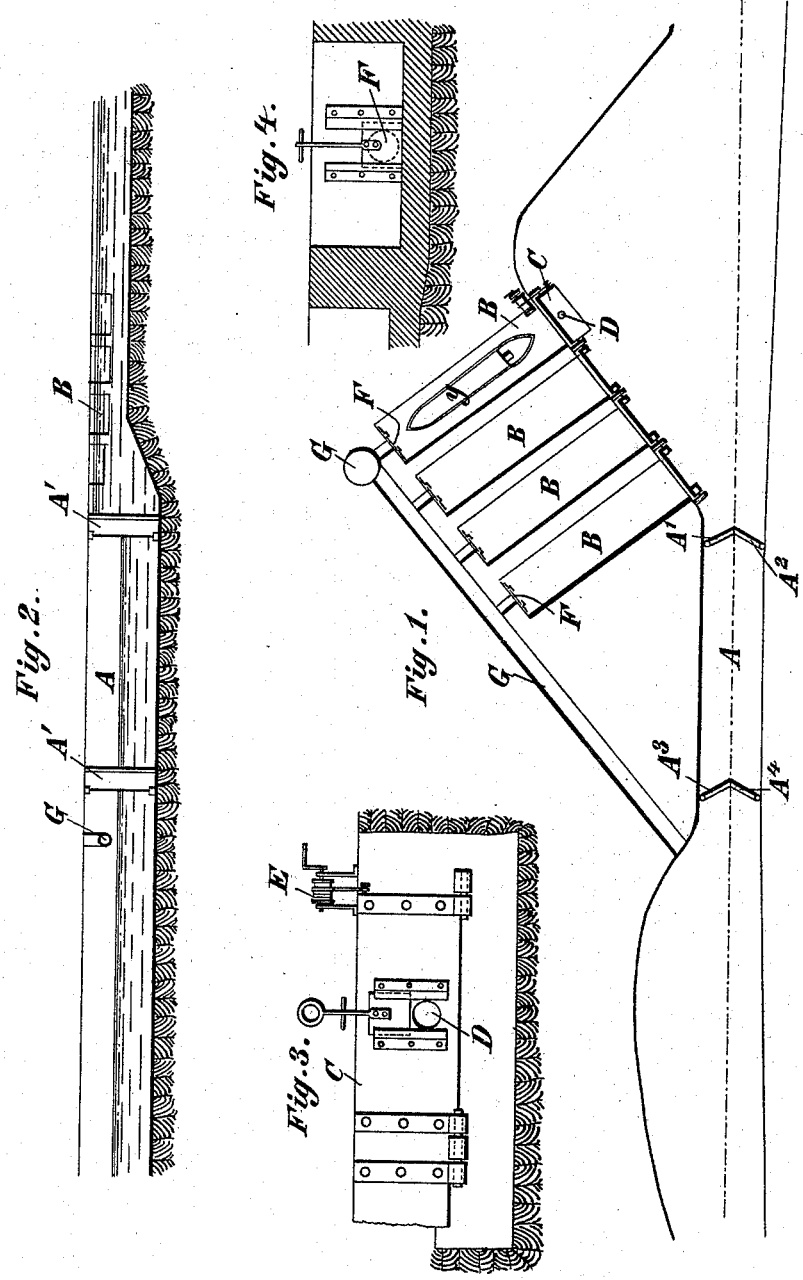

MAX MOESER, OF BERLIN, AND REINHOLD ERPEL, OF TEGELORT, GERMANY.

DRY DOCK.

SPECIFICATION forming part of Letters Patent No. 526,190, dated September 18, 1894.

Application filed October 10, 1893. Serial No. 487,733. (No model.)

*To all whom it may concern:*

Be it known that we, MAX MOESER, merchant, residing at 30 Lessingstrasse, Berlin, and REINHOLD ERPEL, master ship-builder, residing at Tegelort, near Tegel, both in the Kingdom of Prussia and German Empire, have invented new and useful Improvements in and Relating to the Construction of Dry Docks in Inland Navigation, Canals, and the Like, of which the following is a specification, reference being had therein to the accompanying drawings.

It is of great importance in the development and support of traffic upon canals and inland navigation generally to provide for a cheap, easy and rapid repairing of barges and other vessels using the canals or canalized rivers and it is the object of the present invention to meet this requirement. At the present time if repairs are wanted to vessels in such canals, considerable time and force are expended in drawing them upon land and returning them afterward to the water, or else costly appliances are used for lifting from and replacing them in the water. Apart from the straining and sometimes breaking of the vessels under such operation rendering many useless, the aforesaid methods have the disadvantage of cost and waste of time.

The following is a description of the new construction enabling dry docks to be fixed on canals or canalized rivers, reference being made to the annexed drawings, in which—

Figure 1 is a plan view; Fig. 2, a sectional elevation of the improved system with its appurtenances; and Figs. 3 and 4 are detail views in elevation and section on a larger scale.

Above one of the locks A of the canal where there is a sufficient fall of water there are arranged a number of separate basins or docks B the length and breadth of which must be sufficient for the convenient repair of such vessels as frequent the canal and the depth sufficient for floating the said vessels into the basins when full. Each such basin is separated from the canal proper by a watertight door or flap C having a passage way D below the water level of the canal and closed by a sluice as shown in Fig. 3. The doors C may be hinged below and while the basins are empty will be held closed by the water pressure from the canal. When however the water is allowed to fill the basins until the level therein is the same as that of the canal the pressure on the door is reduced or compensated and the latter may be opened to admit the vessel to be repaired. The door is weighted to sink in the water and after admission of the vessel it is raised again into pieces by means of the winch E. At the other end of each basin is a further hermetically closed opening F through which the water in the basin may be run off into a cross channel G communicating with the canal below the lock A so as to leave the basin in which the vessel lies empty. Repairs can now be executed and when finished the opening F is closed and D opened to again fill the basin whereupon the door C can be opened, the vessel floats out and another brought in. A', A², A³, A⁴, are the lock gates. The advantages of this arrangement are that, owing to the location of the basin or basins and their connections with the upper and lower levels of the canal, the water may run out of the basins by natural means to provide dry docks, and yet there is no loss of water as it is simply passed from one level of the canal to another.

What we claim, and desire to secure by Letters Patent of the United States, is—

In a canal, canalized river or similar inland navigation system the combination with a lock where a fall of water level occurs, of a basin or series of basins communicating by doors with the water above the lock and having water inlets to the water above the lock and water outlets to the water below the lock, both adapted to be closed; said basins being adapted for the reception of vessels for repairing and other purposes.

In witness whereof we hereunto set our hands in presence of two witnesses.

MAX MOESER.
REINHOLD ERPEL.

Witnesses:
PAUL FISCHER,
JOHN SATONSKI.